United States Patent [19]

Burch

[11] Patent Number: 4,610,240
[45] Date of Patent: Sep. 9, 1986

[54] SOLAR LIGHTER

[76] Inventor: John D. Burch, 3516 Dublin Rd., Charlotte, N.C. 28208

[21] Appl. No.: 713,128

[22] Filed: Mar. 18, 1985

[51] Int. Cl.⁴ ............................................... F24J 2/08
[52] U.S. Cl. .................................... 126/440; 126/451
[58] Field of Search ..................... 126/440, 451, 417; 350/319

[56] References Cited

U.S. PATENT DOCUMENTS 4,076,014 2/1978 Wiquel ................................ 126/440

FOREIGN PATENT DOCUMENTS 2414691 9/1979 France ................................. 126/451

Primary Examiner—Samuel Scott
Assistant Examiner—Noah Kamen
Attorney, Agent, or Firm—Ralph H. Dougherty

[57] ABSTRACT

A solar furnace comprises a hollow tube, a concentrating lens at one end of the tube and a wooden base at the other end with a hole vertically through the base, whereby a cigarette, cigar or fishing line can be inserted in the hole and ignited by concentration of the sun's rays thereon.

12 Claims, 13 Drawing Figures

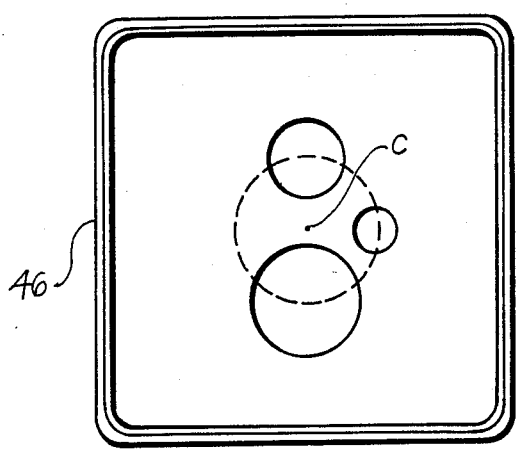
Fig. 10
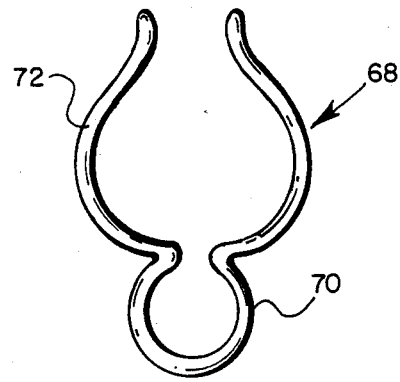
Fig. 11
Fig. 12
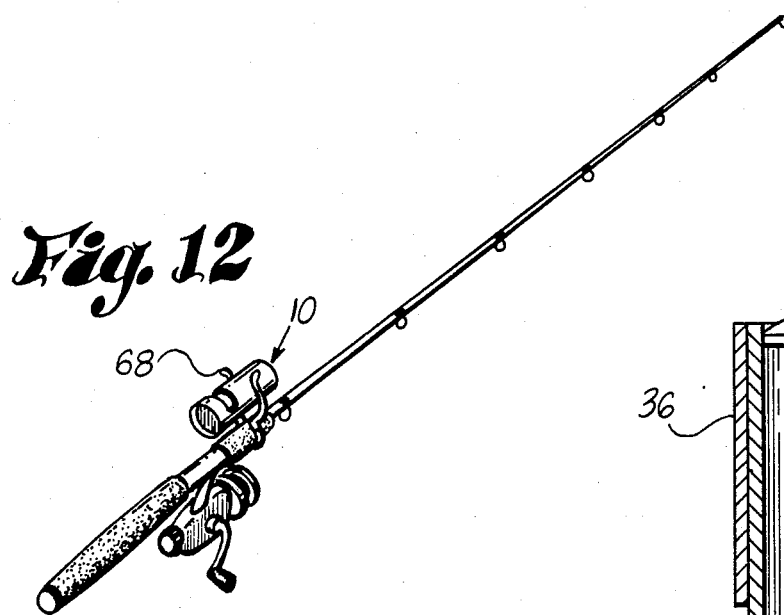
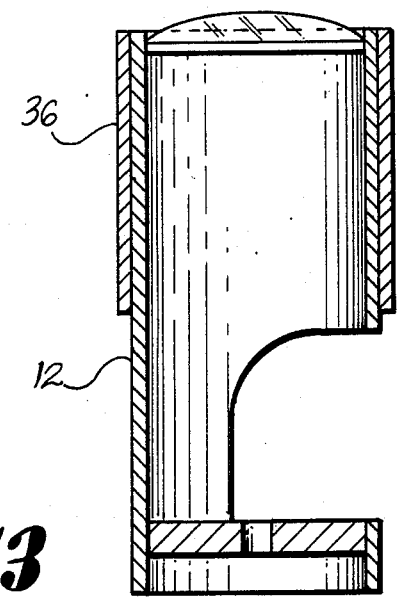
Fig. 13

SOLAR LIGHTER

BACKGROUND OF THE INVENTION

The present invention relates to a solar furnace, and more particularly to a solar lighter, specifically as related to cigarette and other tobacco products which may be ignited by means of heat from concentration of the sun's rays and directing concentrated rays onto the object to be ignited. The ignited substance is therefore free from the contamination of fuel, chemical or other foreign substances. The invention has the advantage of being immune to wind and dampness. It potentially reduces the risk of accidental fire resulting from an open flame, being extremely useful for fishing, hiking, skiing and other outdoor activities. The invention may be permanently installed on a fishing rod, ski pole, or the like, or it may be portable.

Although the invention is principally applicable to lighting tobacco products such as cigarettes and cigars, it is also suitable for cutting monofilament fishing line and, by removing the detachable base, it may be used for starting fires from soft wood for a variety of purposes.

It has been well known for many years that solar energy can be concentrated by a lens to focus onto an object to heat the object to a high temperature, and, if combustible, to set it on fire. An early patent which utilized a lens to concentrate light onto a stump to ignite it and burn it out for removal was Rieke U.S. Pat. No. 612,675.

Wiquel U.S. Pat. No. 4,076,014 teaches a solar cigarette lighter having a hollow tube with a lens at one end and a focal point at approximately the mid-point of the tube near a stop which prevents the cigarette from extending further into the tube. This patent is also limited by the requirement that ribs project inwardly from the inside wall of the tube to center and guide a cigarette. Wiquel's apparatus is specifically limited to the lighting of a cigarette. The present apparatus is not so limited, but encompasses cigarette, cigar and pipe lighters as well as monofilament line cutters.

OBJECTS OF THE INVENTION

The principal object of the invention is to provide a method of lighting a cigarette or cigar without using fuel, flint or any energy source other than the sun.

Another object of the invention is to provide a method of igniting any combustible material without concern for the natural elements such as wind.

It is also an object of the invention to provide a convenient method for cutting monofilament fishing line.

It is also an object of the invention to provide apparatus for cutting line which can be mounted on a fishing pole or the like.

SUMMARY OF THE INVENTION

The invention is a generally tubular article having a light concentrating lens at one end and a wooden base at the other. The base is provided with a hole generally off-centered therein for accomodating a tobacco product, such as a cigarette, or other object.

BRIEF DESCRIPTION OF THE DRAWINGS

This invention is better understood by reference to the following detailed description and to the appended drawings, in which:

FIG. 10 is a top view of an alternative embodiment of the base of FIG. 7.

FIG. 11 is an end view of a spring clip for attaching the solar furnace of FIG. 1 to a rod or pole.

FIG. 12 is an isometric view of a fishing rod with showing the invented solar furnace mounted thereon.

FIG. 13 is an elevational cross section of an alternative embodiment of the invented solar furnace having a slidable cover.

DETAILED DESCRIPTION

Figure 1:
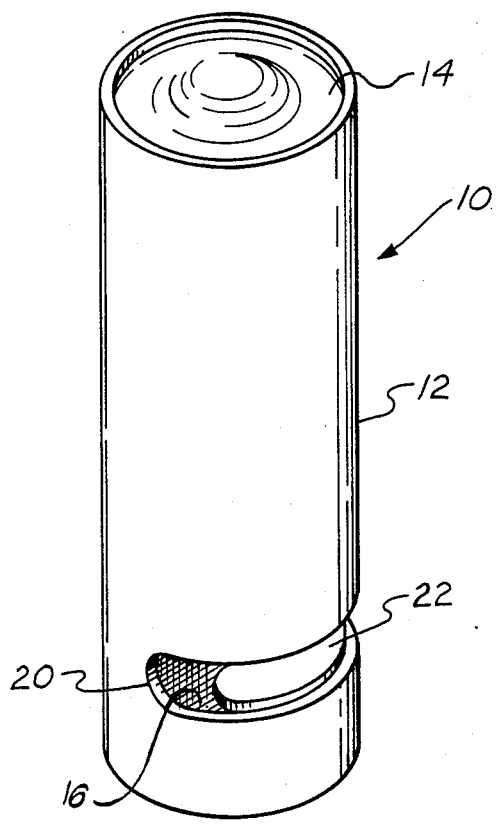
FIG. 1 is an isometric view of the invented solar furnace.

Referring now to FIG. 1, which depicts the solar lighter in its entirety, the invented solar furnace 10 has three principal parts, a hollow tube 12, a lens 14, and a wooden base 16. Attached to the top of the hollow tube 12 is a high powered convex lens 14, preferably a 1 ⅝ horsepower convex magnifying glass. The inside of tube 12 is larger than the full diameter of the cigarette or object to be lighted. The tube 12 which is preferably cylindrical is constructed of a light metal, such as aluminum, or any suitable plastic material, clear acrylic, or glass.

The wooden base 16 is fixed in the end of the tube 12 remote from the lens, and is provided with a hole 18. The hole 18 is preferably off-set from the center of the base, and is the solar hot-spot, the lens being adjusted so that its focal point is within the hole, for igniting the object to be burned. To ignite a cigarette or other object, the object is placed in the hole 18 within the base 16, and the lens 12 is aimed at the sun, the rays of which are concentrated at the solar hot-spot. Smoke escapes through a space or slot 20 remote from the lens and above the base 16.

It has been found that a wooden base promotes more rapid ignition than a base made of any other material. The theory to which we subscribe, but do not wish to be held, is that the wooden base acts as an insulator and prevents heat from being conducted away from the item on which the sun's rays are concentrated. Further, it has been found that a small pad of pine bark 22, when placed adjacent to and partially surrounding hole 13 accelerates ignition of tobacco products and other items at the ignition location.

Figure 6:
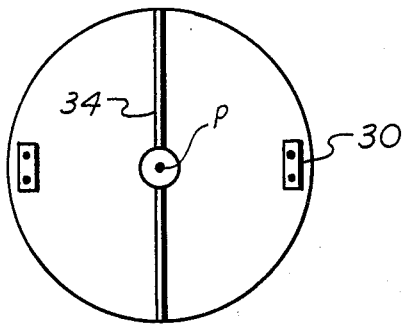
FIG. 6 is a top view of the base of the solar furnace shown in FIG. 5.
Figure 7:
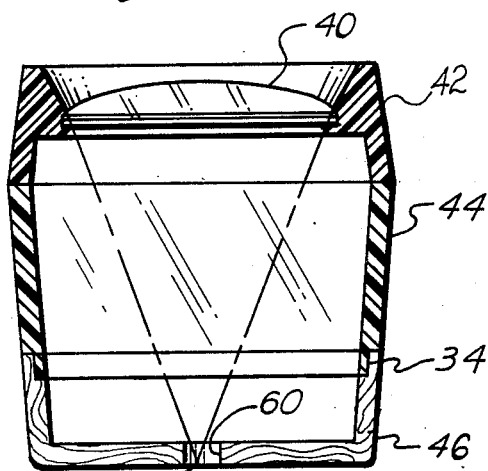
FIG. 7 is a cross section elevational view of another alternative embodiment of the invented solar furnace.

The upper part of the furnace can be joinable to the lower wooden base by a variety of means, including fastening clips 30 as shown in FIG. 6, or a friction joint 32 as shown in FIG. 7.

When it is desired to cut a monofilament fishing line with the embodiment of FIG. 6, the line is placed in slot 34 across the focal point P and the cylinder is pointed toward the sun. The line will part instantly, with a ball of filament forming on each end of the cut line.

ALTERNATIVE EMBODIMENTS

Figure 2:
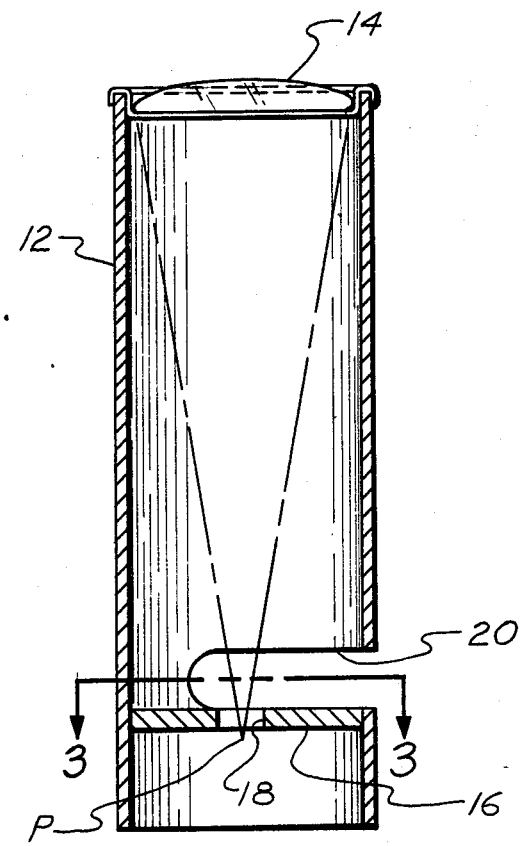
FIG. 2 is an elevational cross section of the invented solar furnace.
Figure 3:
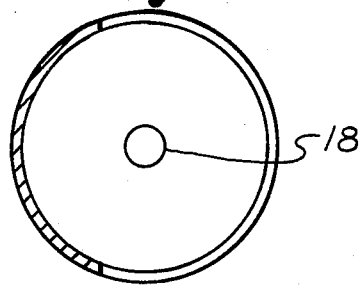
FIG. 3 is a horizontal cross section taken along the line 3—3 of FIG. 2.
Figure 4:
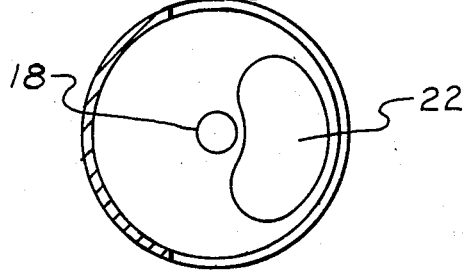
FIG. 4 is a horizontal cross-section of the embodiment of FIG. 1 taken at the same location as the section shown in FIG. 3.
Figure 5:
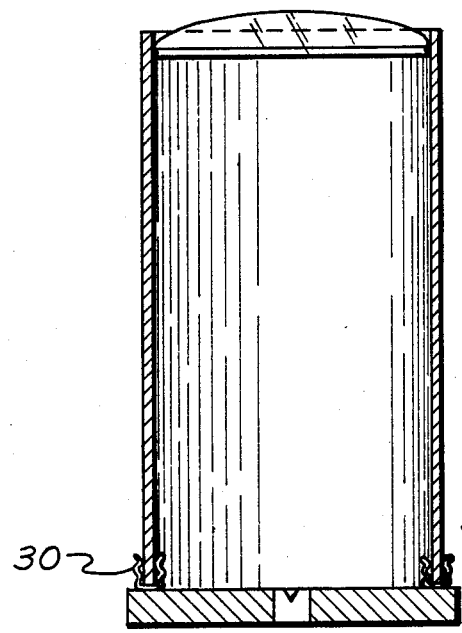
FIG. 5 is an elevational cross section of an alternative embodiment of the invented solar furnace.
Figure 8:
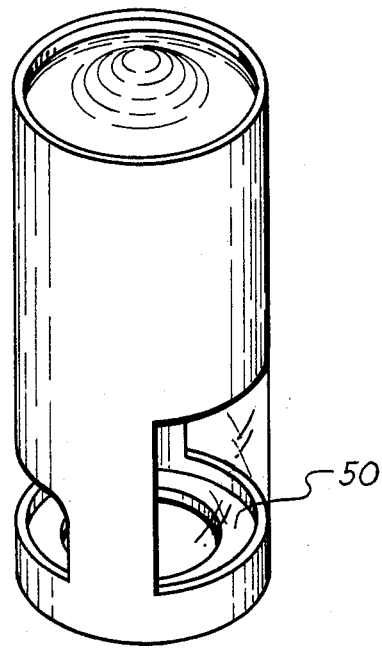
FIG. 8 is an isometric view of still another alternative embodiment of the solar furnace for lighting a pipe.
Figure 9:
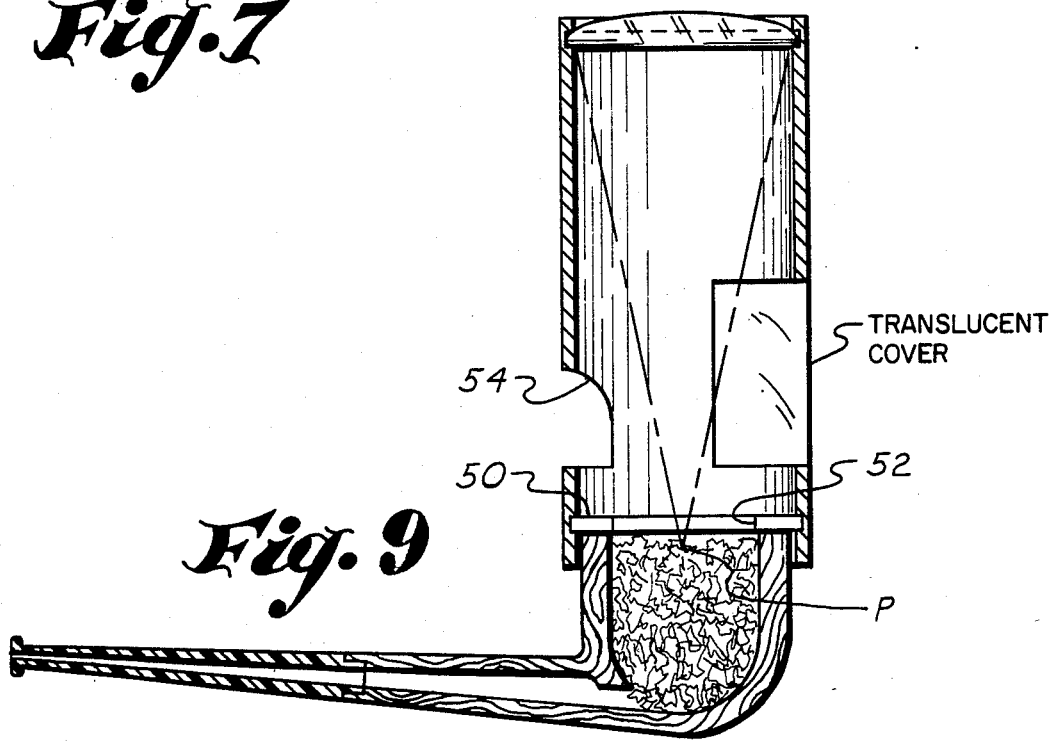
FIG. 9 is a cross section elevational view of the embodiment of FIG. 8 shown in conjunction with a pipe.

While the solar furnace can be a closed tube as shown in FIG. 5, it is preferable that it have a slot 20 as shown in FIGS. 1 and 2 in order for the user to observe the concentration of sunlight or the solar hot spot onto the proper location. Alternatively, a clear acrylic, plexiglass, glass, or other transparent material can be either utilized as the tube material itself or as a portion of the tube material in order to allow observation of the solar hot spot as shown in FIGS. 8 and 9. Alternatively, a slidable translucent cover 36 can be mounted on the exterior of tube 12 as shown in FIG. 13. After a tobacco product is ignited, the cover can be raised to clear smoke from the interior of the solar furnace.

The solar furnace embodiment shown in FIG. 7 has a light concentrating lens 40 affixed in an opaque plastic holder 42. A transparent acrylic tube 44 extends downwardly from the opaque lens holder. Wooden base 46 is notched to receive the tube in a friction joint 34. The wooden base is provided with either a central hole 60 or an off-set hole in its bottom to accomodate an item to be ignited. The furnace can be provided with one or more interchangeable bases which have varying sized holes to accomodate smokers of different tobacco products, such as cigarettes, which generally require a 9/32 hole, cigars, which generally require a 13/32 hole, and other tobacco products such as small or odd-sized cigars which may require a different diameter hole. The base could also be provided with multiple holes of different diameters to accomodate various sized tobacco products, as shown in FIG. 10. The focal point P would be directed to an appropriate off center location, and the base 46 would be rotated so that the desired size hole contained the focal point.

The alternative embodiment shown in FIGS. 8 and 9 can be used to light a pipe. In this embodiment, the center hole in the base is sufficiently large to allow the focal point P to be located within the pipe bowl when the pipe is placed in lighting position.

The lighter of embodiment shown in FIGS. 1 through 4 can be fixed to a fishing rod by any temporary or permanent means, including wiring. It could also be removably fastened to a fishing rod by a clip such as shown in FIGS. 11 and 12. Clip 68 is made of a spring-like metal or plastic, and has two clip portions. The smaller clip portion 70 is adapted for engagement with a fishing rod, ski pole, or the like, while the larger portion 72 is adapted to receive and hold firmly a solar lighter. More than one such clip can be employed if desired or necessary.

SUMMARY OF THE ACHIEVEMENT OF THE OBJECTS OF THE INVENTION

From the foregoing, it is clear that I have provided a method of lighting a cigarette or cigar without using fuel, flint or any energy source other than the sun; a method of igniting any combustable material without concern for the natural elements such as wind; and a convenient method for cutting monofilament fishing line.

Although preferred and alternative embodiments have been shown and described in accordance with the patent statutes, it should be understood that various modifications and additions may be made thereto by those skilled in the art without departing from the spirit and scope of the invention as set forth in the following claims.

What is claimed is:

1. A solar furnace comprising a hollow tube having a light concentrating lens at one end thereof to focus light at the other end of said tube, a wooden base connected to said tube at the end of said tube remote from said lens, said base being removably attached to said tube, and having a plurality of vertical holes therethrough, each of a different diameter, the focal point of said lens being within one of said holes, the center of each hole being equidistant from the center of the base, whereby rearrangement of the base will bring the lens focal point within the desired diameter hole, said lens being adapted to concentrate rays of sunlight within the space defined by the edges of such hole, whereby a tobacco product or fishing line can be inserted therein and ignited by concentration of the sun's rays thereon.

2. A solar furnace according to claim 1 wherein said base is held to said tube by a friction fit.

3. A solar furnace according to claim 1 wherein at least part of said hollow tube is made of a transparent material.

4. A solar furnace according to claim 1 wherein said hollow tube has a generally rectangular cross section.

5. A solar furnace according to claim 1 wherein said hollow tube has a generally round cross section.

6. A solar furnace comprising an elongated hollow tube having a light concentrating lens at one end thereof to focus light at the other end of said tube, a wooden base connected to said tube at the end of said tube remote from said lens, and having a hole vertically therethrough, said lens being adapted to concentrate rays of sunlight within the space defined by the edges of the hole, said hole being adapted to receive a tobacco product or fishing line therein for ignition by concentration of the sun's rays thereon, said tube having a slot or opening immediately above said base, wherein said slot or opening above said base is adapted to receive a fishing line which, when placed in the slot and drawn tight, will be centered above and adjacent the hole in said base.

7. A solar furnace according to claim 6 further comprising a piece of pine bark affixed to the upper surface of said base adjacent to the vertical hole therein.

8. A solar furnace according to claim 6 wherein at least part of said hollow tube is made of a transparent material.

9. A solar furnace according to claim 6 wherein said hollow tube has a generally rectangular cross section.

10. A solar furnace according to claim 6 wherein said hollow tube has a generally round cross section.

11. A solar furnace according to claim 6 further comprising a transparent sleeve mounted on the exterior of the hollow tube, and slidably movable thereon.

12. In a solar furnace comprising an elongated hollow tube having a light concentrating lens at one end thereof to focus light at the other end of said tube, a wooden base connected to said tube at the end of said tube remote from said lens, and having a hole vertically therethrough, said lens being adapted to concentrate rays of sunlight within the space defined by the edges of the hole, whereby a tobacco product or fishing line can be inserted therein and ignited by concentration of the sun's rays thereon, the improvement comprising a groove across the top of said wooden base, so oriented that a fishing line placed along said groove and across said hole will be located at the focal point of said lens.

* * * * *